United States Patent
Chung et al.

(10) Patent No.: US 10,303,264 B2
(45) Date of Patent: May 28, 2019

(54) OPTICAL ENCODER, CROWN ASSEMBLY AND WEARABLE DEVICE WITH CROWN ASSEMBLY

(71) Applicant: PIXART IMAGING INC., Hsin-Chu (TW)

(72) Inventors: Ching-Lin Chung, Hsin-Chu (TW); Hsin-Chia Chen, Sunnyvale, CA (US)

(73) Assignee: PIXART IMAGING INC., Hsin-Chu (TW)

(*) Notice: Subject to any disclaimer, the term of this patent is extended or adjusted under 35 U.S.C. 154(b) by 150 days.

(21) Appl. No.: 15/478,980

(22) Filed: Apr. 4, 2017

(65) Prior Publication Data
US 2017/0205901 A1  Jul. 20, 2017

Related U.S. Application Data

(63) Continuation-in-part of application No. 15/087,507, filed on Mar. 31, 2016, now Pat. No. 10,061,404.
(Continued)

(30) Foreign Application Priority Data

Mar. 13, 2014  (TW) .............................. 103109350 A
May 28, 2014  (TW) .............................. 103118735 A
Apr. 17, 2015  (TW) .............................. 104112384 A

(51) Int. Cl.
*G06F 3/03* (2006.01)
*G06F 3/0354* (2013.01)
(Continued)

(52) U.S. Cl.
CPC .......... *G06F 3/0312* (2013.01); *G06F 1/1652* (2013.01); *G06F 3/0317* (2013.01); *G06F 3/0383* (2013.01); *G06F 3/03543* (2013.01)

(58) Field of Classification Search
CPC .... G06F 1/1652; G06F 3/0312; G06F 3/0317; G06F 3/03543; G06F 3/0383
See application file for complete search history.

(56) References Cited

U.S. PATENT DOCUMENTS 4,364,035 A * 12/1982 Kirsch ................. G06F 3/0317
                                                       250/202
5,313,229 A *  5/1994 Gilligan ............... G06F 3/0312
                                                       345/157
(Continued)

FOREIGN PATENT DOCUMENTS

TW         201407448 A      2/2014
TW         201500973 A      1/2015

*Primary Examiner* — Siamak Harandi
(74) *Attorney, Agent, or Firm* — Li & Cai Intellectual Property (USA) Office

(57) ABSTRACT

An optical encoder has a displacement generating unit, a light-emitting unit and an optical navigation integrated circuit. The displacement generating unit has an axle body movable along a central axial line thereof. The axle body has a free end with a diameter larger than a part of the axle body and a planar working surface formed on the free end. The light-emitting unit is configured for operatively providing a light beam to irradiate the working surface of the displacement generating unit. The light beam has a divergence angle within a range to reduce scattering. The optical navigation integrated circuit receives the reflected light beam reflected by the working surface, and calculates a relative displacement between the optical navigation integrated circuit and the working surface.

19 Claims, 5 Drawing Sheets

Related U.S. Application Data which is a continuation-in-part of application No. 14/573,023, filed on Dec. 17, 2014, now Pat. No. 9,753,550.

(51) Int. Cl.
*G06F 3/038* (2013.01)
*G06F 1/16* (2006.01)

(56) References Cited

U.S. PATENT DOCUMENTS

2012/0224188 A1  9/2012  Lin et al.
2015/0097778 A1  4/2015  Chang et al.

\* cited by examiner

OPTICAL ENCODER, CROWN ASSEMBLY AND WEARABLE DEVICE WITH CROWN ASSEMBLY

CROSS REFERENCE TO RELATED APPLICATIONS

This application is a Continuation-in-Part of application Ser. No. 15/087,507, filed Mar. 31, 2016, now pending, and entitled OPTICAL NAVIGATION CHIP, OPTICAL NAVIGATION MODULE AND OPTICAL ENCODER, and application Ser. No. 14/573,023, filed Dec. 17, 2014, now pending, and entitled OPTICAL ENCODER AND OPERATING METHOD THEREOF.

BACKGROUND

1. Technical Field

The present disclosure relates to an optical encoder, crown assembly and wearable device having an optical navigation chip, and in particular, to a microminiaturization optical navigation chip, an optical navigation module having the optical navigation chip and an optical encoder.

2. Description of Related Art

Following the technology, more and more electronic devices have an optical navigation function. An optical encoder having the optical navigation function is usually disposed with an optical navigation chip to perform the optical navigation function. For example, the most common optical encoder is an optical mouse.

The conventional optical mouse usually includes a light-emitting unit and the optical navigation chip. The light-emitting unit is configured for operatively providing a light beam to irradiate an object (such as a desktop). The optical navigation chip includes a sensing array. The sensing array is disposed corresponding to a surface of the object for receiving a reflected light beam reflected by the surface and capturing an image belonging to a part of the surface once every capturing interval. The optical mouse compares the images and calculates a displacement between a current position and a previous position of the optical mouse.

If the light-emitting unit does not include an optical lens, such as a condensing lens, the light beam provided by the light-emitting unit would scatter easily, such that the light beam has a low light-intensity. Then, there are discrepancies between the image captured by the sensing array and the actual image. Hence, the light-emitting unit usually comprises an optical lens disposed on a light-emitting port to focus the light beam. Moreover, in order to increase image clarity of the images captured by the sensing array, there is also an optical lens disposed on the sensing array to focus the reflected light beam.

However, as in the above descriptions, the conventional optical encoder needs the optical lenses to focus the light beam, such that a size of the optical encoder increases. It is difficult to simultaneously achieve high accuracy and microminiaturization for the optical encoder. Further, the conventional optical encoder only detects the displacement between a current position and a previous position of the optical mouse, so that a rotational movement and a brightness variation are unable to be detected.

SUMMARY

An exemplary embodiment of the present disclosure provides an optical encoder, which includes a displacement generating unit, a light-emitting unit, and an optical navigation integrated circuit. The displacement generating unit has an axle body movable along a central axial line thereof. The axle body has a free end with a diameter larger than a part of the axle body and a planar working surface formed on the free end. The light-emitting unit is configured for operatively providing a light beam to irradiate the working surface of the displacement generating unit. The light beam has a divergence angle within a range so as to reduce scattering. The optical navigation integrated circuit has a sensing array and a displacement calculating unit. The sensing array is disposed corresponding to the working surface, receives at least a portion of reflected light beam reflected by the working surface, and captures an image related to a part of the working surface once every capturing interval based upon the reflected light beam. The displacement calculating unit is coupled to the sensing array, and is configured for operatively calculating a relative displacement between the optical navigation integrated circuit and the working surface according to the images.

An exemplary embodiment of the present disclosure provides a crown assembly of a wearable device, which includes a crown unit, a light-emitting unit, and an optical navigation integrated circuit. The crown unit has an axle body movable along a central axial line thereof and a crown cap connected to the axle body. The axle body has a free end with a diameter larger than a part of the axle body and a planar working surface formed on the free end. The light-emitting unit is configured for operatively providing a light beam to irradiate the working surface of the displacement generating unit. The light beam has a divergence angle within a range so as to reduce scattering. The optical navigation integrated circuit has a sensing array and a displacement calculating unit. The sensing array is disposed corresponding to the working surface, receives at least a portion of reflected light beam reflected by the working surface, and captures an image related to a part of the working surface once every capturing interval based upon the reflected light beam. The displacement calculating unit is coupled to the sensing array, and is configured for operatively calculating a relative displacement between the optical navigation integrated circuit and the working surface according to the images.

An exemplary embodiment of the present disclosure provides a wearable device having a crown assembly, which includes a housing, a crown unit, a light-emitting unit, and an optical navigation integrated circuit. The housing is formed with a crown hole. The crown unit has an axle body movable along a central axial line thereof and a crown cap connected to the axle body. The axle body has a first section passing through the crown hole and a second section larger than the first section. The second section has a free end formed with a planar working surface. The light-emitting unit is configured for operatively providing a light beam to irradiate the working surface of the displacement generating unit. The light beam has a divergence angle within a range so as to reduce scattering. The optical navigation integrated circuit has a sensing array and a displacement calculating unit. The sensing array is disposed corresponding to the working surface, receives at least a portion of reflected light beam reflected by the working surface, and captures an image related to a part of the working surface once every capturing interval based upon the reflected light beam. The displacement calculating unit is coupled to the sensing array, and is configured for operatively calculating a relative displacement between the optical navigation integrated circuit and the working surface according to the images.

To sum up, the optical encoder can be used as the digital input for a smart watch or other wearable devices. The optical encoder can track the rotational movement and detect the brightness variation on a free end of the axle body, such as a metal shaft, when the shaft is rotated or pressed/released. When the axle body is rotated, the relative rotational movement of the axle body will be detected by the optical encoder and be output to a host controller as motion data in counts. When the axle body is pressed/released, the brightness variation will be detected by the sensor, which will output interrupt signals to the host controller whenever the brightness meets the predefined thresholds.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
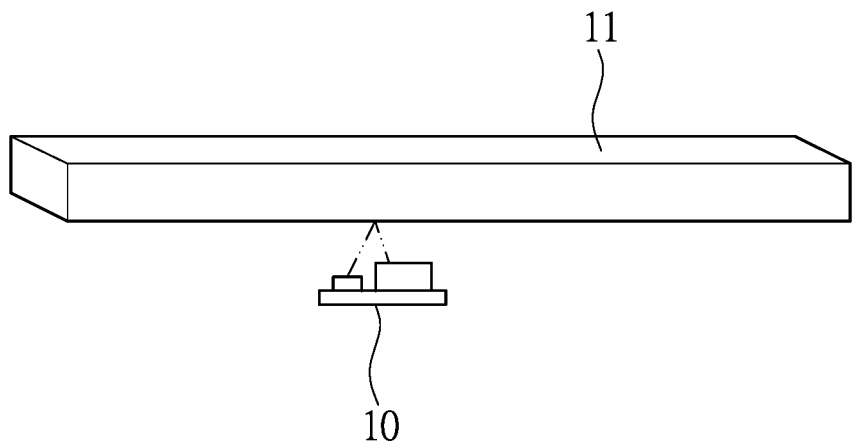
FIG. 1 is a schematic diagram illustrating an optical encoder according to an embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

It should be noted that the terms first, second, third, etc., may be used herein to describe various elements, but these elements should not be affected by such terms. Such terminology is used to distinguish one element from another. Further, the term "or" as used herein may include any one or combinations of the associated listed items.

Referring to FIG. 1, which is a schematic diagram illustrating an optical encoder according to an embodiment of the present disclosure, the optical encoder 1 includes an optical navigation module 10 and a displacement generating unit 11. The optical navigation module 10 is disposed corresponding to a surface of the displacement generating unit 11.

The optical navigation module 10 is configured for operatively providing a light beam and irradiating the surface of the displacement generating unit 11, and then receiving a reflected light beam which the surface of the displacement generating unit 11 reflects. Once every capturing interval, the optical navigation module 10 captures an image belonging to a part of the surface of the displacement generating unit 11 based upon the reflected light beam.

The displacement generating unit 11, such as a ring, a slide rail or a round tube, can be moved to generate a displacement. In certain applications, the displacement generating unit 11 can not be moved, and the optical navigation module 10 can be moved, such that a relative position between the optical navigation module 10 and the displacement generating unit 11 changes. A shape of the displacement generating unit 11 can change to support different applications.

For example, when the optical navigation module 10 is used in an optical mouse, the displacement generating unit 11 is a desktop. A user can operate the optical mouse to generate the displacement, and the optical navigation module 10 calculates the displacement as the optical mouse moves on the desktop. Or, the optical navigation module 10 can be used in a syringe, and the displacement generating unit 11 can be a plunger rod. When the plunger rod is pulled or pushed, the optical navigation module 10 can sense the displacement of the plunger rod.

In brief, when the relative position between the optical navigation module 10 and the displacement generating unit 11 changes, the optical navigation module 10 can determine the displacement of the optical navigation module 10 according to the images associated with the surface of the displacement generating unit 11, and calculate a relative displacement between the optical navigation module 10 and the displacement generating unit 11.

In the embodiment, the surface of the displacement generating unit 11 does not have any specific special pattern. In the event that it does have a special pattern, the special pattern could be such as a recognition block, and a light reflection rate of the recognition block being different from a light reflection rate of the surface, or the special pattern could be such as an etching pattern, the etching pattern being below the surface and forming a notch. It should be noted that the aforesaid special patterns are merely taken as examples, and the present disclosure is not limited thereto.

Figure 2:
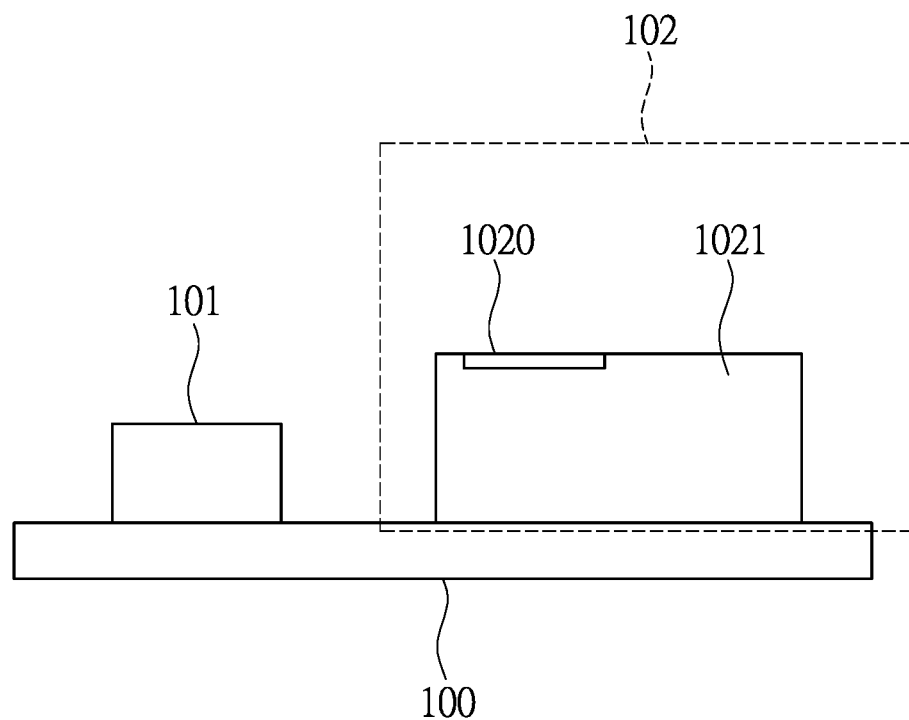
FIG. 2 is a schematic diagram illustrating an optical navigation module according to an embodiment of the present disclosure.

Referring to FIG. 2, which is a schematic diagram illustrating an optical navigation module according to an embodiment of the present disclosure, the optical navigation module 10 includes a substrate 100, a light-emitting unit 101 and an optical navigation chip 102. The light-emitting unit 101 and the optical navigation chip 102 are disposed on the substrate 100. The substrate 100 is such as a printed circuit board (PCB). The light-emitting unit 101 is proximate to the optical navigation chip 102. A spacing distance between the light-emitting unit 101 and the optical navigation chip 102 can be changed based on practical demands, as long as the optical navigation chip 102 can receive the reflected light beam provided by the surface of the displacement generating unit (such as the displacement generating unit 11 shown in FIG. 1).

The light-emitting unit 101, such as a laser diode or a light emitting diode, is configured for operatively providing the light beam to irradiate the surface of the displacement generating unit 11. The light beam provided by the light-emitting unit 101 has a low divergence angle. Thus, the light-emitting unit 101 does not need an optical lens to focus or expand the light beam for reducing scattering.

When the light-emitting unit 101 is the laser diode, the light-emitting unit 101 provides a laser light beam. The laser light beam with low divergence angle does not scatter easily. Hence, the laser diode can be used in the optical navigation module 10 directly. More specifically, a low divergence angle means that a horizontal divergence angle and a vertical divergence angle of the light beam are respectively less than 10 degrees and 35 degrees. When the light-emitting unit 101 is the light emitting diode, the light emitting diode is specially designed for providing a light beam with low divergence angle.

In brief, the light-emitting unit 101 can be a laser diode, a light emitting diode or other elements which can provide a light beam with low divergence angle. Thus, the light-emitting port of the light-emitting unit 101 does not have to be disposed with an optical lens for focusing the light beam. Incidentally, the values of the low divergence angle mentioned above are merely taken as an example, and the present disclosure is not limited thereto. Those skilled in the art can appropriately adjust the divergence angle of the light beam based on the divergence angle of the laser light beam to accomplish the optical navigation module 10 mentioned above.

The optical navigation chip includes a sensing array 1020 and a displacement calculating unit 1021. The sensing array 1020 is coupled to the displacement calculating unit 1021. The sensing array 1020, such as a Complementary Metal-Oxide Semiconductor (CMOS) image sensing array, or a Charge-coupled Device (CCD) image sensing array, is composed by a plurality of pixels forming a pixel matrix. Due to the optical navigation module 10 being disposed corresponding to the surface of the displacement generating unit 11, the sensing array 1020 receives the reflected light beam reflected by the surface and captures an image belonging to a part of the surface once every capturing interval based upon the reflected light beam.

As described previously, the light beam provided by the light-emitting unit 101 has a low divergence angle, such that the light beam is completely provided to the surface of the displacement generating unit 11. On the other hand, the surface of the displacement generating unit 11 completely reflects the light beam to the sensing array 1020. Thus, the sensing array 1020 can capture a clear image without setting up an optical lens to focus the reflected light beam.

Incidentally, light-cohesion of the laser light beam is higher than light-cohesion of the light beam provided by the light emitting diode. In the embodiment, the sensing array 1021 can obtain a clearer image when the optical navigation module 10 uses the laser diode as a light source.

The displacement calculating unit 1021 having an image processing function is configured for operatively receiving the image outputted by the sensing array 1020, and processes the images. Next, the displacement calculating unit 1021 calculates a relative displacement between the optical navigation chip 102 and the surface of the displacement generating unit 11 according to the images. The technique related to calculating the relative displacement is well known to those of ordinary skill in the art, thus it does not bear repeating herein.

After obtaining the relative displacement between the optical navigation chip 102 and the displacement generating unit 11, the displacement calculating unit 1021 outputs the calculated result to back-end circuits. Then, the back-end circuits implement a corresponding function, such as moving a cursor of the mouse.

Figure 3:
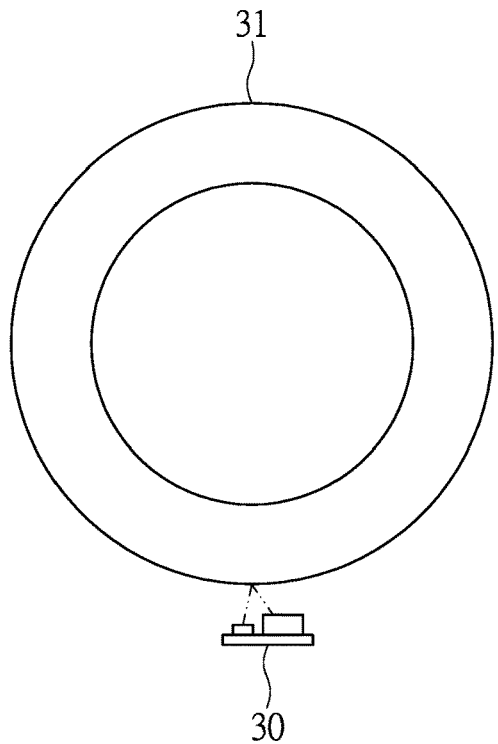
FIG. 3 is a schematic diagram illustrating an optical encoder according to another embodiment of the present disclosure.

Referring to FIG. 3, which is a schematic diagram illustrating an optical encoder according to another embodiment of the present disclosure, the optical encoder 3 also includes an optical navigation module 30 and a displacement generating unit 31. Structures and functions of the optical navigation module 30 are similar to the optical navigation module 10 shown in FIG. 1, thus only the differences therebetween will be described below.

Different from the optical navigation module 10 shown in FIG. 1, the displacement generating unit 31 of the optical encoder 3 is a ring. The optical navigation module 30 is disposed corresponding to an external surface of the displacement generating unit 31.

For example, the optical encoder 3 is used in a stereo system as a volume control knob. A user can adjust the volume of the stereo system by turning the optical encoder 3. The optical navigation module 30 senses the external surface of the displacement generating unit 31 to calculate a relative displacement between an optical navigation chip of the optical navigation module 30 and the external surface of the displacement generating unit 31. Next, the optical navigation module 30 outputs the calculated relative displacement to a back-end circuit, such as a host, and then the back-end circuit correspondingly adjusts the volume of the stereo system.

As with the previous embodiment, the external surface of the displacement generating unit 31 of this embodiment can be a smooth surface without any special pattern or there can be at least one special pattern disposed on the external surface of the displacement generating unit 31, and the optical navigation module 30 can calculate the relative displacement between the optical navigation module 30 and the displacement generating unit 31 by using the special pattern.

It should be noted that, in the embodiment, the external surface of the displacement generating unit 31 can further include a starting pattern. When the sensing array of the optical navigation module 30 detects the starting pattern, the displacement calculating unit of the optical navigation module 30 determines that the displacement generating unit 31 has rotated one cycle and returned to a starting point (such as the starting pattern).

Figure 4:
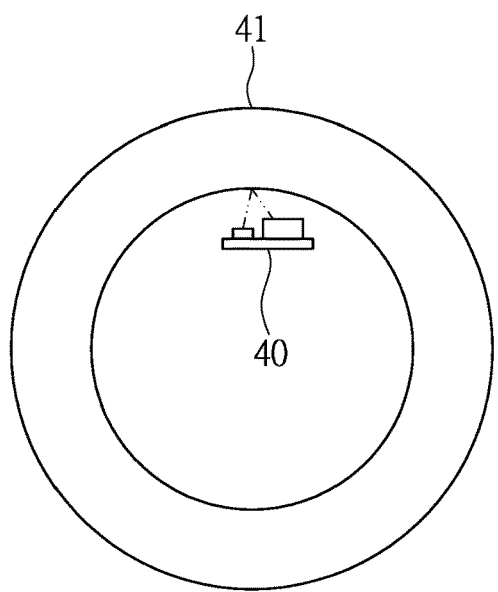
FIG. 4 is a schematic diagram illustrating an optical encoder according to another embodiment of the present disclosure.

Referring to FIG. 4, which is a schematic diagram illustrating an optical encoder according to another embodiment of the present disclosure, the optical encoder 4 also includes an optical navigation module 40 and a displacement generating unit 41. Structures and functions of the optical navigation module 40 are similar to the optical navigation module 10 shown in FIG. 1 and the optical navigation module 30 shown in FIG. 3, thus only the differences therebetween will be described below.

The displacement generating unit 41 of the optical encoder 4 is also a ring. Different from the optical encoder 3 shown in FIG. 3, the optical navigation module 40 is disposed corresponding to an inner surface of the displacement generating unit 41. A flow chart for the optical navigation module 40 calculating a relative displacement would be similar to that for the optical navigation module 30, and further descriptions thereof are therefore omitted.

Figure 5:
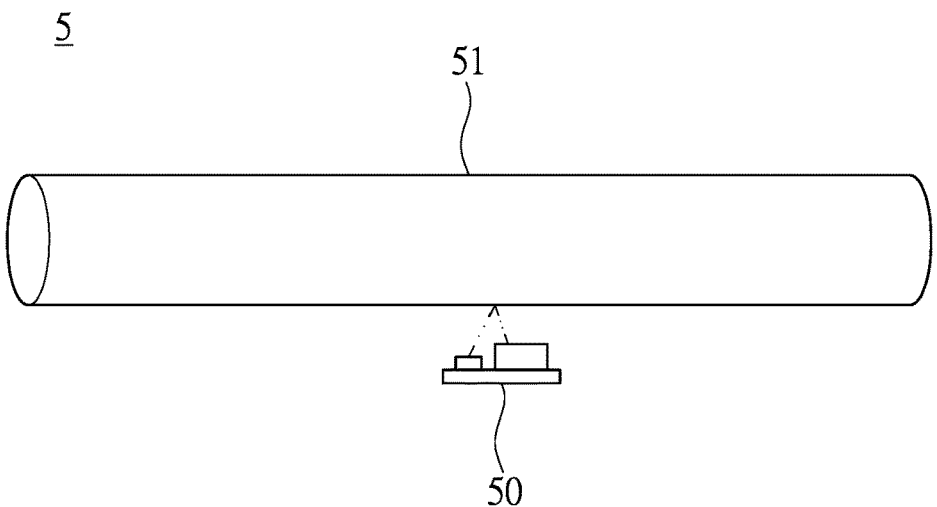
FIG. 5 is a schematic diagram illustrating an optical encoder according to another embodiment of the present disclosure.

Referring to FIG. 5, which is a schematic diagram illustrating an optical encoder according to another embodiment of the present disclosure, the optical encoder 5 also includes an optical navigation module 50 and a displacement generating unit 51. Structures and functions of the optical navigation module 50 are similar to the optical navigation module 10 shown in FIG. 1, the optical navigation module 30 shown in FIG. 3 and the optical navigation module 40 shown in FIG. 4, thus only the differences therebetween will be described below.

Different from the optical encoders 1, 3 and 4, the displacement generating unit 51 of the optical encoder 5 is a round tube. The optical navigation module 50 is disposed corresponding to an external surface of the displacement generating unit 51.

For example, the optical encoder 5 is a knob disposed at one side of a smart watch. A user can turn the knob to adjust the time or date of the smart watch. When the knob is turned to generate a displacement, the optical navigation module 50 detects the external surface of the knob to calculate a relative displacement between an optical navigation chip of the optical navigation module 50 and the external surface of the knob. Next, the optical navigation module 50 outputs the calculated relative displacement to a back-end circuit (such as a processor of the smart watch), such that the back-end circuit correspondingly adjusts the time or the date of the smart watch.

As with the previous embodiments, the external surface of the displacement generating unit 51 can be a smooth surface without any special pattern or there can be at least one special pattern disposed on the external surface of the displacement generating unit 51. The external surface of the displacement generating unit 51 can further include a starting pattern. When the sensing array of the optical navigation module 50 detects the starting pattern, the displacement calculating unit of the optical navigation module 50 determines that the displacement generating unit 51 has rotated one cycle.

Figure 6:
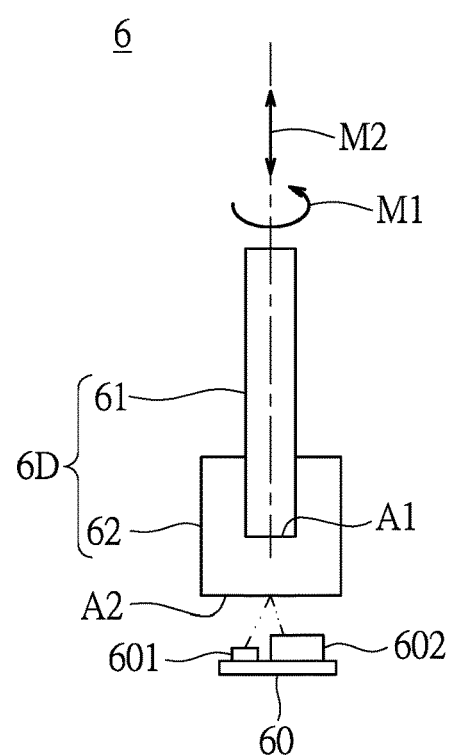
FIG. 6 is a schematic diagram illustrating an optical encoder and a crown of a watch according to the present disclosure.

Referring to FIG. 6, this embodiment provides an optical encoder 6, which includes a displacement generating unit 6D and an optical navigation module 60. For example, the optical encoder 6 can be applied to a crown assembly for a smart watch or other wearable devices. The optical navigation module 60 is disposed at an end surface of the column-shaped displacement generating unit 6D.

According to this exemplary embodiment, the displacement generating unit 6D has an axle body 61, which is movable along a central axial line thereof, such as a rotational movement M1 and/or a linear movement M2. The axle body 61 has a free end with a diameter which is larger than a part of the axle body 61. The free end is formed with a planar working surface. In other words, the axle body 61 has a first section A1 and a second section A2, and a diameter of the second section A2 is larger than a diameter of the first section A1. The working surface is formed on an end surface of the second section A2. The external surface of the free end of the displacement generating unit 6D can be a smooth surface without any special pattern or there can be at least one special pattern disposed on the external surface of the displacement generating unit 6D. The material of the axle body 61 can be types of metal, e.g. stainless steel. The free end that faces the optical navigation module 60 is preferably a smooth finishing with a roughness average of less than 0.5 μm.

The optical navigation module 60 has a light-emitting unit 601 and an optical navigation integrated circuit 602. The light-emitting unit 601 is configured for operatively providing a light beam to irradiate the working surface (A2) of the displacement generating unit 6D. The light beam has a divergence angle within a range so as to reduce scattering. The light-emitting unit can be a laser diode to provide a laser light beam.

The optical navigation integrated circuit 602 can be an optical navigation chip such as the one described above and shown in FIG. 2. Since the optical navigation chip can be separated from the light-emitting unit 601, it can be taken as an optical navigation integrated circuit. As shown in FIG. 2, the optical navigation chip has a sensing array 1020 and a displacement calculating unit 1021. The sensing array does not have an optical lens to focus the reflected light beam, and a horizontal divergence angle and a vertical divergence angle of the light beam are respectively less than 10 degrees and 35 degrees. The sensing array 1020 is disposed corresponding to the working surface, receives at least a portion of reflected light beam reflected by the working surface, and captures an image related to a part of the working surface once every capturing interval based upon the reflected light beam. The displacement calculating unit 1021 is coupled to the sensing array 1020, and is configured for operatively calculating a relative displacement between the optical navigation chip and the working surface according to the images. According to this embodiment applied to a crown assembly of a watch, the relative displacement can be an axial displacement M2 including push-in and pull-out, and/or a rotational displacement M1 along a central axial line thereof.

Figure 7:
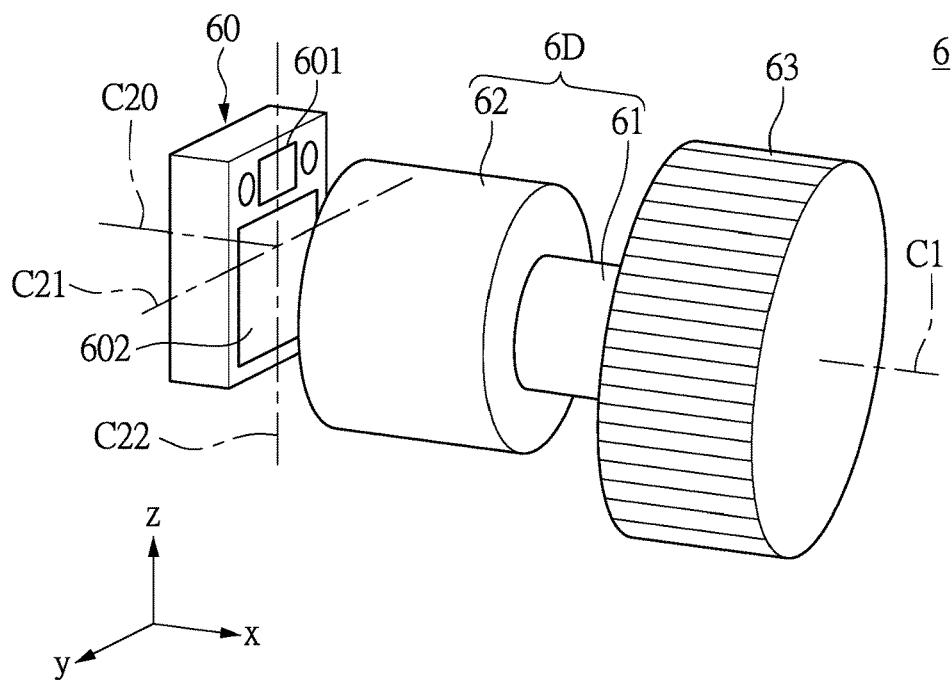
FIG. 7 is a perspective view of the optical encoder and the crown of the watch according to the present disclosure.
Figure 8:
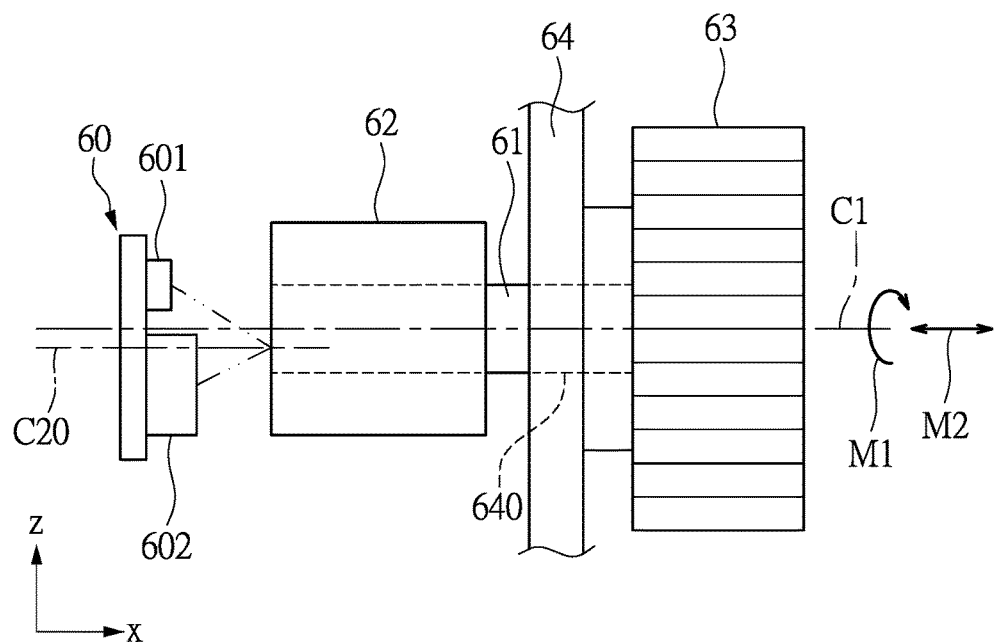
FIG. 8 is a side view of the optical encoder and the crown of watch having according to the present disclosure.
Figure 9:
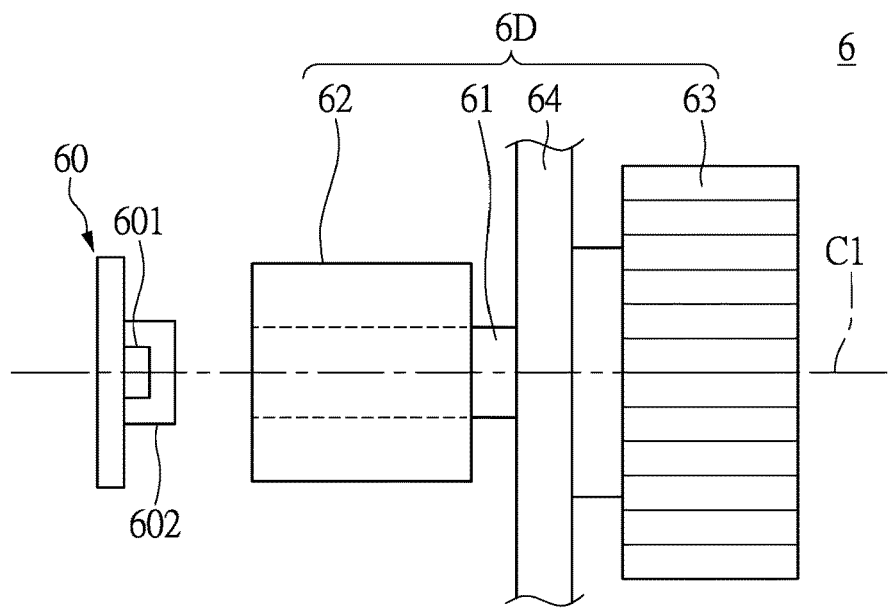
FIG. 9 is a top view of the optical encoder and the crown of watch having according to the present disclosure.

Referring to FIG. 7 to FIG. 9, the optical navigation module 60 is defined with a first central line C21 along the working surface. The first central line C21 passes through a center of the sensing array and a center of the displacement calculating unit (as shown in FIG. 2). As shown in FIG. 8, the first central line C21 deviates from the central axial line C1 of the axle body 61 of the displacement generating unit 6D. The optical navigation module 60 is further defined with a second central line C22 along the working surface that is perpendicular to the first central line C21. The second central line C22 is aligned with the central axial line C1 of the axle body 61 of the displacement generating unit 6D.

The displacement generating unit 6D is movable along the central axial line C1 of the axle body 61 so as to produce a displacement relative to the light-emitting unit 601. The displacement calculating unit 6D is configured for detecting a change of a monochromatic intensity of the reflected light beam so as to output a signal representing a movement of the displacement generating unit 6D. The displacement generating unit 6D is movable along the central axial line C1 of the axle body 61 so as to produce a displacement relative to the light-emitting unit 601. The displacement calculating unit 6D is configured for operatively calculating the displacement according to a change of a monochromatic intensity of the reflected light beam.

Figure 10:
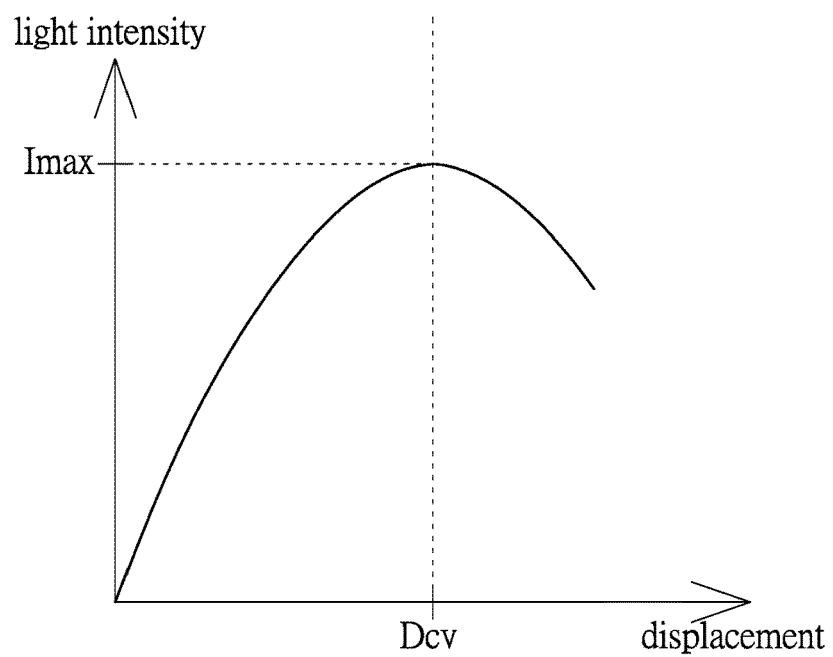
FIG. 10 is a diagram of a light intensity and a displacement of the optical encoder according to the present disclosure.

Referring to FIG. 10, the monochromatic intensity of the light beam is increased along with the increase of the displacement of the displacement generating unit 6D when the displacement is smaller than a critical value Dcv of the displacement. A distance between the working surface of the displacement generating unit 6D and the light-emitting unit 601 is smaller than the critical value Dcv of the displacement. In other words, the monochromatic intensity of light beam has a maximum value Imax when the displacement is equal to the critical value Dcv. Therefore, the present disclosure can detect a brightness variation on the free end of the axle body 61, such as a metal shaft, when the shaft is pressed or released.

Referring to FIG. 8 and FIG. 9, this embodiment can be applied as a crown assembly of a wearable device. The displacement generating unit 6D can be taken as a crown unit having an axle body 61. The crown assembly of the wearable device includes the crown unit, and a crown cap 63 connected to the axle body 61. The light beam is irradiated on the working surface of the crown unit. For the crown assembly, the second section A2 can be a metal sleeve in the shape of a round column that is assembled to the first section A1. The crown unit can be moved by pushing, pulling or rolling the crown cap 63 along the central axial line C1 of the axle body 61 so as to produce a displacement relative to the light-emitting unit 601. Further, the wearable device has a housing 64, which is formed with a crown hole 640. The axle body 61 has a first section A1 passing through the crown hole 640.

In summary, the optical encoder can be used as the digital input for a smart watch or other wearable devices. The optical encoder can track the rotational movement and detect the brightness variation on a free end of the axle body, such as a metal shaft, when the shaft is rotated or pressed/released. When the axle body is rotated, the relative rotational movement of the axle body will be detected by the optical encoder and be output to a host controller as motion data in counts. When the axle body is pressed/released, the brightness variation will be detected by the sensor, which will output interrupt signals to the host controller whenever the brightness meets the predefined thresholds.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An optical encoder, comprising:
   a displacement generating unit, having an axle body movable along a central axial line thereof, wherein the axle body has a free end with a diameter larger than a part of the axle body and a planar working surface formed on the free end; and
   an optical navigation module, wherein the optical navigation module includes:
   a light-emitting unit, configured for operatively providing a light beam to irradiate the working surface of the displacement generating unit, wherein the light beam has a divergence angle within a range to reduce scattering; wherein the axle body of the displacement generating unit is movable and rotatable along the central axial line of the axle body to produce a relative displacement relative to the light-emitting unit, wherein the relative displacement has an axial displacement and a rotational displacement, and
   an optical navigation integrated circuit, including:
   a sensing array, disposed corresponding to the working surface, receiving at least a portion of reflected light beam reflected by the working surface, and capturing an image related to a part of the working surface once every capturing interval based upon the reflected light beam; and
   a displacement calculating unit, coupled to the sensing array, configured for operatively calculating the relative displacement between the optical navigation integrated circuit and the working surface of the axle body according to the images.

2. The optical encoder according to claim 1, wherein the axle body has a first section and a second section, a diameter of the second section being larger than a diameter of the first section, wherein the working surface is formed on an end surface of the second section.

3. The optical encoder according to claim 1, wherein the optical navigation module is defined with a first central line along the working surface, wherein the first central line passes through a center of the sensing array and a center of the displacement calculating unit, the first central line deviating from the central axial line of the axle body of the displacement generating unit.

4. The optical encoder according to claim 3, wherein the optical navigation module is further defined with a second central line along the working surface that is perpendicular to the first central line, the second central line being aligned with the central axial line of the axle body of the displacement generating unit.

5. The optical encoder according to claim 1, wherein the displacement calculating unit is configured for detecting a change of a monochromatic intensity of the reflected light beam to output a signal representing a movement of the displacement generating unit.

6. The optical encoder according to claim 1, wherein the displacement calculating unit is configured for operatively calculating the displacement according to a change of a monochromatic intensity of the reflected light beam.

7. The optical encoder according to claim 6, wherein the monochromatic intensity is increased along with the increase of the displacement of the displacement generating unit when the displacement is smaller than a critical value of the displacement, wherein a distance between the working surface of the displacement generating unit and the light-emitting unit is smaller than the critical value.

8. The optical encoder according to claim 1, wherein the sensing array does not include an optical lens to focus the reflected light beam, wherein a horizontal divergence angle and a vertical divergence angle of the light beam are respectively less than 10 degrees and 35 degrees.

9. The optical encoder according to claim 8, wherein the light-emitting unit is a laser diode to provide a laser light beam.

10. A crown assembly of a wearable device, comprising:
    a crown unit, having an axle body movable along a central axial line thereof and a crown cap connected to the axle body, wherein the axle body has a free end with a diameter larger than a part of the axle body and a planar working surface formed on the free end;
    an optical navigation module, wherein the optical navigation module includes:
    a light-emitting unit, configured for operatively providing a light beam to irradiate the working surface of the crown unit, wherein the light beam has a divergence angle within a range to reduce scattering, wherein the axle body of the crown unit is movable and rotatable along the central axial line of the axle body to produce a relative displacement relative to the light-emitting unit, wherein the relative displacement has an axial displacement and a rotational displacement; and
    an optical navigation integrated circuit, including:
    a sensing array, disposed corresponding to the working surface, receiving a reflected light beam reflected by the working surface, and capturing an image related to a part of the working surface once every capturing interval based upon the reflected light beam; and a displacement calculating unit, coupled to the sensing array, and configured for operatively calculating the relative displacement between the optical navigation integrated circuit and the working surface of the axle body according to the images.

11. The crown assembly of wearable device according to claim 10, wherein the axle body has a first section and a second section, a diameter of the second section being larger than a diameter of the first section, wherein the working surface is formed on an end surface of the second section.

12. The crown assembly of wearable device according to claim 11, wherein the second section is a metal sleeve in a shape of a round column that is assembled to the first section.

13. The crown assembly of wearable device according to claim 10, wherein the optical navigation module is defined with a first central line along the working surface, wherein the first central line passes through a center of the sensing array and a center of the displacement calculating unit, the first central line being deviated from the central axial line of the axle body of the crown unit.

14. The crown assembly of wearable device according to claim 13, wherein the optical navigation module is further defined with a second central line along the working surface that is perpendicular to the first central line, the second central line being aligned with the central axial line of the axle body of the crown unit.

15. The crown assembly of wearable device according to claim 10, wherein the displacement calculating unit is configured for detecting a change of a monochromatic intensity of the reflected light beam to output a signal representing a movement of the crown unit.

16. The crown assembly of wearable device according to claim 11, wherein the displacement calculating unit is configured for operatively calculating the displacement according to a change of a monochromatic intensity of the reflected light beam.

17. The crown assembly of wearable device according to claim 16, wherein the monochromatic intensity is increased along with the increase of the displacement of the crown unit when the displacement is smaller than a critical value of the displacement, wherein a distance between the working surface of the crown unit and the light-emitting unit is smaller than the critical value.

18. A wearable device having a crown assembly, comprising:

a housing, formed with a crown hole;

a crown unit, having an axle body movable along a central axial line thereof and a crown cap connected to the axle body, wherein the axle body has a first section passing through the crown hole and a second section larger than the first section, wherein the second section has a free end formed with a planar working surface;

a light-emitting unit, configured for operatively providing a light beam to irradiate the working surface of the crown unit, wherein the light beam has a divergence angle within a range to reduce scattering, wherein the axle body of the crown unit is movable and rotatable along the central axial line of the axle body to produce a relative displacement relative to the light-emitting unit, wherein the relative displacement has an axial displacement and a rotational displacement; and an optical navigation integrated circuit, including:
　a sensing array, disposed corresponding to the working surface, receiving a reflected light beam reflected by the working surface, and capturing an image belong to a part of the working surface once every capturing interval based upon the reflected light beam; and
　a displacement calculating unit, coupled to the sensing array, and configured for operatively calculating the relative displacement between the optical navigation integrated circuit and the working surface of the axle body according to the images.

19. The wearable device having a crown assembly according to claim 18, wherein the second section is a metal sleeve in a shape of a round column that is assembled to the first section.

* * * * *